United States Patent [19]

Hongo

[11] Patent Number: 5,603,236
[45] Date of Patent: Feb. 18, 1997

[54] SHEET MATERIAL BENDING ANGLE DETECTOR, AND OPERATION METHOD OF PRESS MACHINE USING THE DETECTOR

[76] Inventor: Toshio Hongo, 7-11, Kounodai 5-chome, Ichikawa-shi, Chiba-ken, Japan

[21] Appl. No.: 139,361

[22] Filed: Oct. 19, 1993

[30] Foreign Application Priority Data

Nov. 6, 1992 [JP] Japan .................................. 4-337753

[51] Int. Cl.⁶ ...................................................... B21D 5/02
[52] U.S. Cl. ........................... 72/319; 72/389.1; 72/31.11; 33/1 N
[58] Field of Search ................................. 72/32, 26, 389; 33/1 N, 1 PT, 534

[56] References Cited

U.S. PATENT DOCUMENTS

| 4,489,586 | 12/1984 | Hess | 72/389 |
|---|---|---|---|
| 4,802,357 | 2/1989 | Jones | 72/702 |

FOREIGN PATENT DOCUMENTS

| 166351 | 1/1986 | European Pat. Off. | 72/702 |
|---|---|---|---|
| 2044199 | 3/1972 | Germany | 72/389 |
| 8105266 | 6/1983 | Netherlands | 33/1 N |
| 0825237 | 5/1981 | U.S.S.R. | 72/389 |

*Primary Examiner*—David Jones

[57] ABSTRACT

A device for measuring a bending angle of a bent sheet material including a bending angle detector including first and second links arranged symmetrically relative to each other and pivotally connected with each other at one end thereof, a support mechanism for supporting the angle detector on a displaceable ram of the sheet bending press and for displacing the angle detector into an angular space defined by the bending angle of the bent sheet material, and a mechanism for biasing the first and second links into a surface contact with side surfaces of the bent sheet material defining the bending angle.

2 Claims, 7 Drawing Sheets

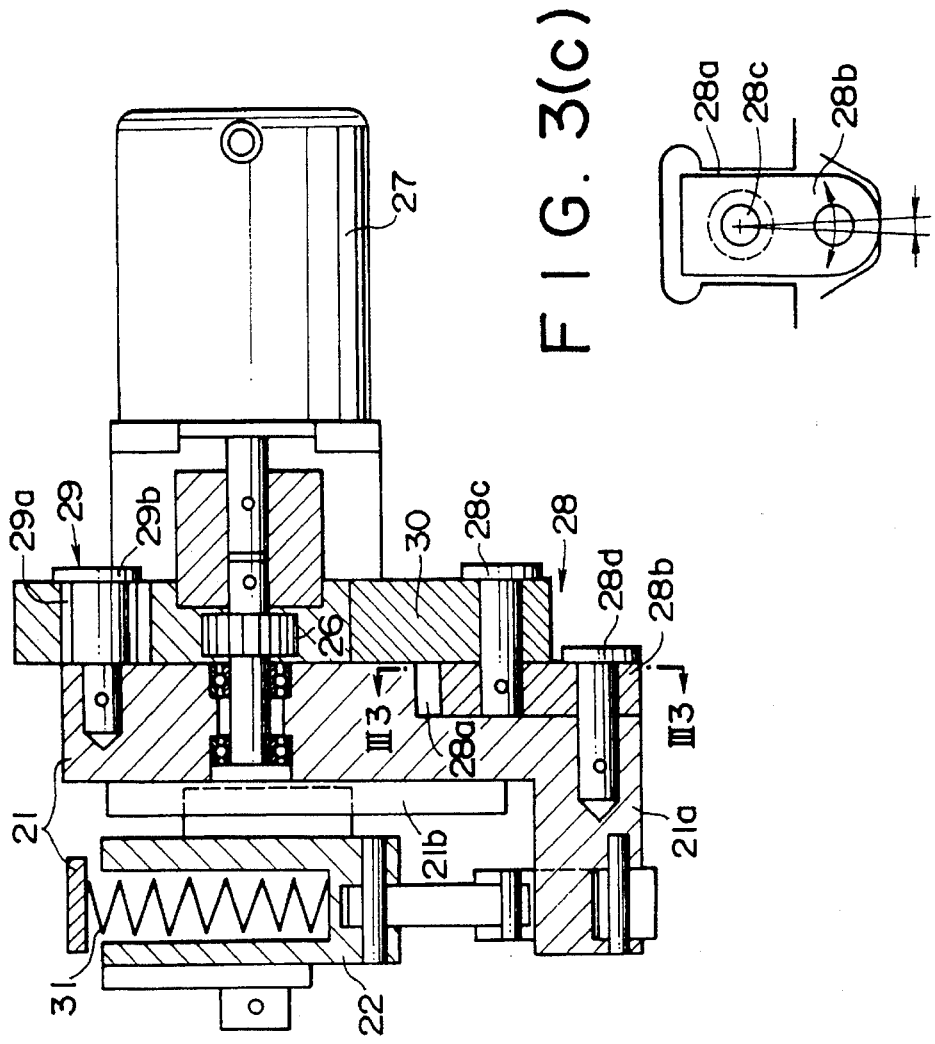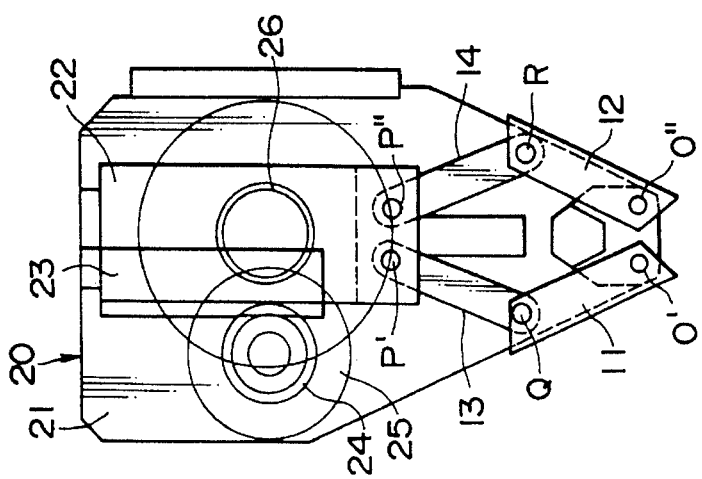

SHEET MATERIAL BENDING ANGLE DETECTOR, AND OPERATION METHOD OF PRESS MACHINE USING THE DETECTOR

BACKGROUND OF THE INVENTION

This invention relates to a sheet material bending angle detector and to an operation method of a press machine using the bending angle detector.

DESCRIPTION OF THE RELATED ART

In a press machine such as a press brake, when an upper die pushes a sheet material into a rectangular groove of a lower die, bends it and then leaves the sheet material, a phenomenon referred to as "spring-back", in which deformation of the sheet material returns due to flexibility of the sheet material, though only limitedly, occurs. Therefore, after the bending operation is completed, the bent sheet material is withdrawn and its bending angle is measured so as to judge acceptance of the finish angle.

To eliminate such a troublesome operation, a proposal has been made (Japanese Patent Laid-Open No. 247415/1985) wherein a sensor for measuring the distance to an outer surface of the bent sheet or to a point below an apex is disposed in the lower die, and a bending angle is computed from this distance. However, since exclusive sensors must be provided individually to different lower dies, this method is expensive and moreover, since measurement is indirect measurement, measuring accuracy is not much high.

Another proposal has been made (Japanese Patent Laid-Open No. 202928/1982) wherein a gauge is disposed by the side of the lower die, and a bending angle is computed from a horizontal distance and a vertical distance from groove edges at a specific point of the portion of the sheet material protruding diagonally upwards from a groove and forming one of the sides of the angle. However, if the thickness of the sheet material is not constant or in other words, if the inner and outer surfaces of the sheet material are not precisely parallel and moreover, if the attitude of the sheet material inside the groove changes, measurement can no longer be made accurately. Furthermore, measurement cannot at all be made for those sheet materials which do not protrude from the groove up to the gauge.

It is therefore an object of the present invention to provide a bending angle detector which is relatively simple in construction, and can directly measure a bending angle of a bent sheet material irrespective of its attitude. Measurement and re-bending can be repeated automatically until a desired bending angle can be obtained, by the use of this bending angle detector.

SUMMARY OF THE INVENTION

To accomplish the object described above, the present invention provides a bending angle detector for a sheet material which comprises first and second links, each being disposed in line symmetry with respect to the other and being fitted pivotally at one of the ends thereof to a detector main body, and third and fourth links, each being disposed in similar line symmetry with respect to the same line of symmetry, and being fitted pivotally at one of the ends thereof to the other end of each of the first and second links; wherein the other end of each of the third and fourth links is supported by the detector main body in such a manner as to be capable of moving along the line of symmetry or along parallel lines existing on both sides of the line of symmetry, the first and second links are brought into contact with the inner surfaces of the sheet material defining an angle between them, and the position or displacement of the other end of each of the third and fourth links is measured.

A bending angle detector suitable for a sheet material to be bent into an L shape comprises a first link pivotally fitted at one of the ends thereof to a detector main body and a second link pivotally connected at one of the ends thereof to the other end of the first link, wherein the other end of the second link is supported by the detector main body in such a manner as to be capable of moving linearly along a guide line connecting one of the ends of the first link and the other end of the second link, the first link and a surface of the detector main body, which is in parallel with the guide line, are brought into contact with the inner surfaces of the sheet material defining an angle between them, and the position or displacement of the other end of the second link is measured.

To operate a press machine having a movable male die or a female die and capable of changing the depth of a groove of the female die by the use of such a bending angle detector, an operation method of the present invention comprises first effecting a bending operation at an angle having a certain specific positive error outside an allowable limit of a target value of a bending angle, measuring the bending angle by inserting the bending angle detector movably supported by the press machine into a range of the angle defined by the sheet material, correcting the stroke of the movable die or the depth of the female die groove when the measured bending angle is outside the allowable limit of the positive error, effecting further the bending operation, and repeating the measurement of the bending angle, the correction of the stroke or the groove depth, and the bending operation, until a bending angle within the allowable limit of the positive error can be obtained.

According to the present invention, the bending angle is measured by bringing the first and second links of the bending angle detector into contact with the inner surfaces of both sides of the sheet material defining the angle between them. Therefore, measurement can be made without being affected by the attitude of the sheet material and by the change of the thickness of the sheet material, and moreover, without being affected by the dimension of the sides of the sheet material defining the angle between them. Moreover, this measurement can be carried out under the state where the load applied to the sheet material is removed completely, and hence, without any influences of spring-back.

According to the present invention, further, the bending operation is first carried out at an angle corresponding to insufficiency of bending of the sheet material, and measurement of the bending angle, the correction of the stroke of the movable die or the groove depth, and the bending operation, are automatically repeated for the sheet material which is being fitted to the press machine. In this way, it is possible to gain a great advantage that a desired bending angle can be obtained.

BRIEF DESCRIPTION OF THE DRAWINGS

FIG. 3 is front and partially cut-away side views of the bending angle detector;

DESCRIPTION OF THE PREFERRED EMBODIMENTS

Figure 1A:
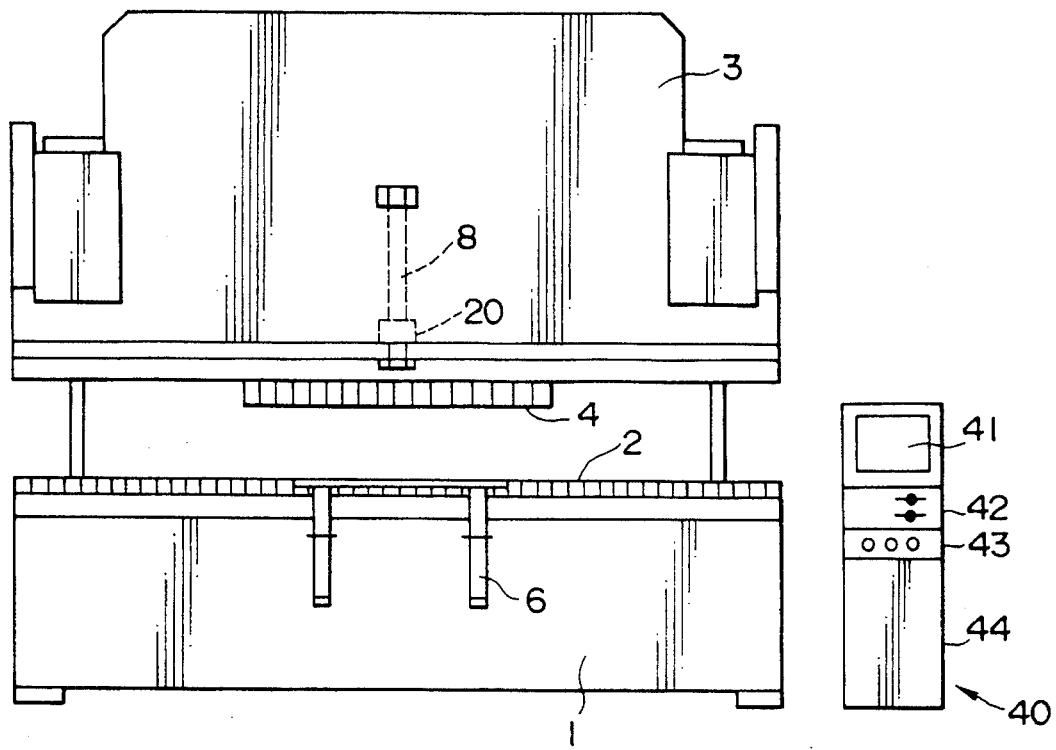
FIG. 1 is front and side views of a press brake according to an embodiment of the present invention.
Figure 1B:
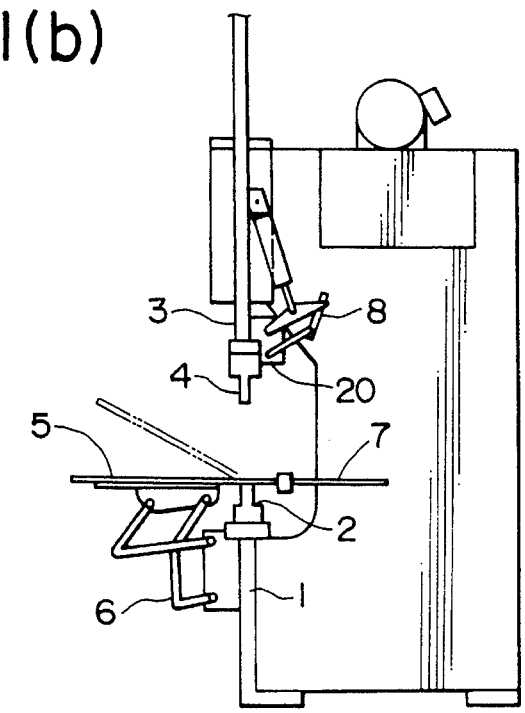

FIG. 1 depicts a press brake equipped with a bending angle detector for a sheet material according to the present invention. A lower die 2 consisting of a plurality of split die portions each having a rectangular groove of a variable depth is mounted onto a bed 1. A ram 3 is allowed to move up and down relative to this bed 1, and an upper die 4 is fixed to the lower end of this ram 3.

A sheet material 5 to be bent is placed on a link mechanism support device 6 positioned on the front side of the lower die 2, is supported on the support device 6 by suitable means, whenever necessary, and is pushed until it strikes a gauge 7 which is at the back of the lower die 2 and decides the dimension of one of the sides of a bending angle. The ram 3 is lowered, and the upper die 4 pushes the sheet material 5 into the rectangular groove of the lower die 2 and bends it. The front side of the sheet material 5 bent into a rectangular form, that is, the product, is diagonally lifted up as indicated by two-dot-chain line, and the lower surface of the sheet material is supported by the support device 6. The upper die 4 is again moved up and returned by the ram 3, and a later-appearing bending angle detector is fitted into an angle falling within the bending range of the sheet material 5 by a feed mechanism 8 fitted to the ram 3.

Figure 2A:
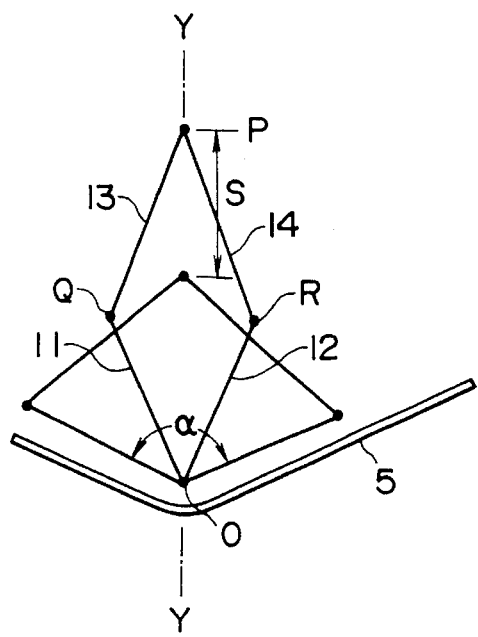
FIG. 2 is a structural view useful for explaining the principle of a bending angle detector.

The theoretical construction of the bending angle detector will now be explained with reference to FIG. 2. It will be hereby assumed, as shown in FIG. 2(a), that a fixed node O at the lower end of a 4-node link mechanism consisting of four links 11, 12, 13 and 14 pivotally connected to one another at nodes O, P, Q and R is positioned inside the apex of an angle described by the bent sheet material 5 (whereby the node O is shown a little spaced apart from the apex for ease of understanding), and that the opposed node P is movable on a Y—Y axis which is a bisector of this angle. When this link mechanism extending elongatedly along the Y—Y axis is contracted along the Y—Y axis and the links 11 and 12 come into contact with both sides of the angle described by the bent sheet 5, the angle α between these links 11 and 12 is equal to the bending angle of the sheet 5. The change of the angle defined by the links 11 and 12 is related with the displacement S of the node P. Therefore, the bending angle of the sheet material can be determined by measuring this displacement S.

Figure 2B:
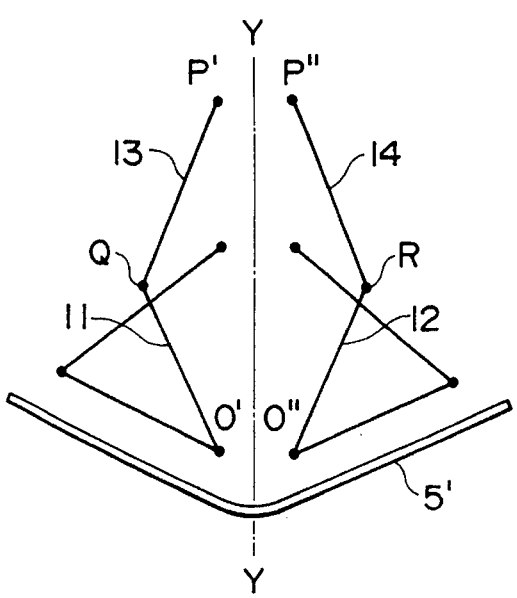

As shown in FIG. 2(b), the upper and lower nodes P and O of the link can be divided into two nodes P', P" and O', O" which are symmetric with respect to the Y—Y axis.

Figure 2C:
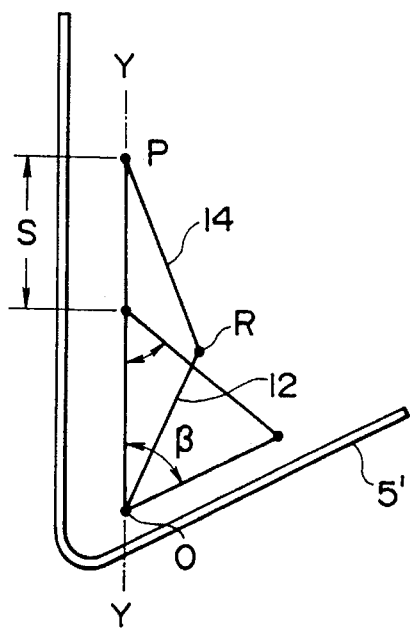

Furthermore, as shown in FIG. 2(c), it is also possible to employ a 3-node link mechanism having only two links 12 and 14 positioned on one of the sides of the Y—Y axis. It will be assumed in this case that the nodes O and P existing at the other end of each of the two links 12 and 14 pivotally connected to each other through the node R exist on the Y—Y axis parallel to one of the sides of the angle defined by the bent sheet material 5, that the node O is fixed and positioned inside the apex of the angle defined by the sheet material 5 (the node O being shown at a position spaced apart a little from the apex for ease of understanding), and that the node P is movable on the Y—Y axis. When the link 12 is moved in parallel with the other side of the angle, the angle α defined between the link 12 and the Y—Y axis is equal to the bending angle of the sheet material 5. The displacement S of the node P from the initial position is related with the change of the angle β. Therefore, the bending angle of the sheet material 5 can be determined from the angle β by measuring this displacement S.

FIG. 3 shows a practical construction of the bending angle detector 20 corresponding to FIG. 2(b). The links 11 and 12 of the link mechanism are pivotally connected to a horizontal arm 21a of a detector main body 21 by pins functioning as the fixed nodes O', O" at the lower end. The upper end each of the links 13 and 14, which are pivotally connected to these links 11 and 12 by pins as the nodes Q and R, is fitted to a slider 22 by pins as the nodes P' and P". This slider 22 is so guided by a guide plate 21b fixed to the detector main body 21 as to be capable of linearly moving up and down. A rack 23 is fitted to the side of this slider 22, and a pinion 24 engaging with the rack 23 is transmission-coupled with a rotary encoder 27 through gears 25 and 26 meshing with the pinion 24.

Obviously, the links 11, 12 and 13, 14 can be fixed to the horizontal arm 21a and to the slider 22 by using one each of the pins 0 and P in place of the two pins O', O" and P', P", as in FIG. 2(a).

Contact sensors for confirming sufficient contact of the links 11 and 12 with the surfaces of the bent sheet 5 defining the angle between them can be provided to these links 11 and 12. The detector main body 21 is supported by a fitting member 30 through attitude regulation devices 28 and 29 so that the links 11 and 12 can come into reliable contact with the sheet surfaces in conformity with the attitude of the sheet material 5. The attitude regulation device 28 comprises a belt plate 28b accommodated in a vertical groove 28a at the lower end of the main body 21 and having a width a little smaller than the groove width, a pin 28c loosely fitting to the fitting member 30 and supporting the belt plate 28b so as to support the belt plate 28b swingable a bit inside the groove 28a, and a pin 28d fitting loosely to the belt plate 28b and implanted to the main body 21. The attitude regulation device 29 comprises a pin 29b so fixed to the main body 21 as to penetrate through the fitting member 30 with a ring-like gap 29a therebetween.

Figure 4:
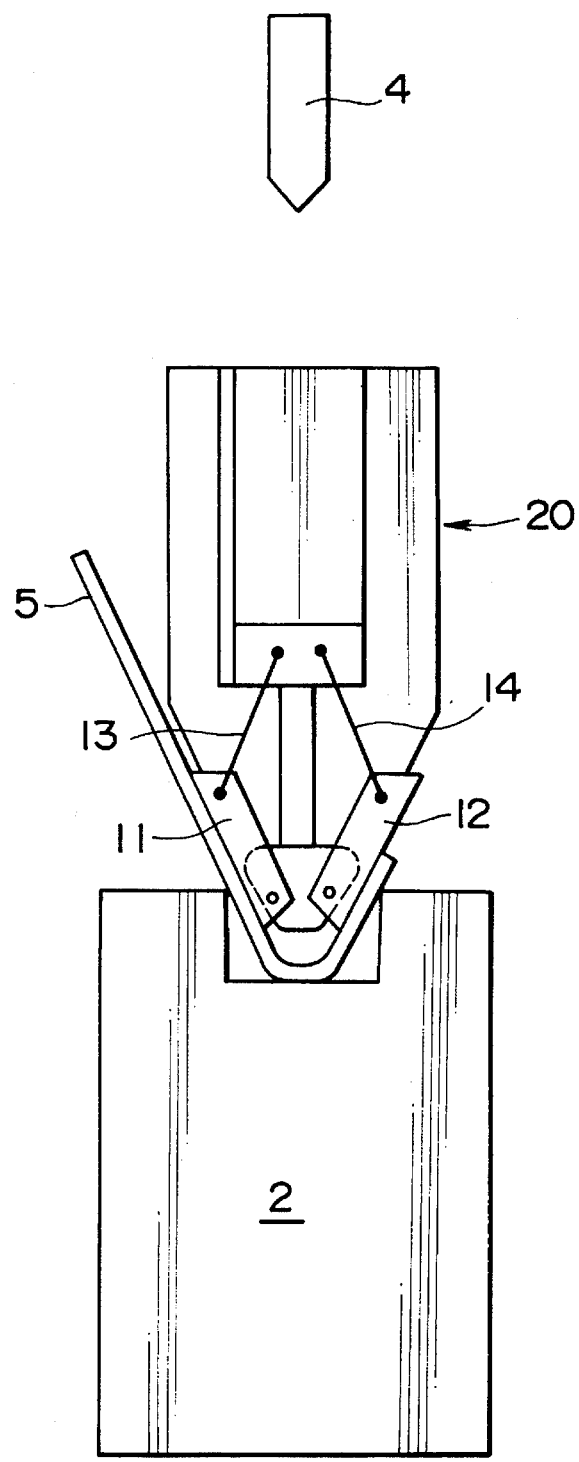
FIG. 4 is a front view showing the bending angle detector when it is in use.

When the upper die 4 is lowered towards the lower die 2, the sheet material 5 is bent inside the rectangular groove of the lower die 2 as is well known in the art, and the upper die 4 is again moved up. Next, the detector 20 is inserted (FIG. 4) into the angle within the bending range of the sheet material 5 through the support mechanism 8 (FIG. 1), and is stopped at a predetermined position. Then, the slider 22 is pushed down by a spring 31 until the links 11 and 12 come into reliable contact with the surfaces of the sheet material 5 defining the angle between them. Displacement of the nodes P' and P" and hence, the displacement of the slider 22, is amplified by the rack 23, the pinion 24 and the gears 25 and 26, is converted to a rotating quantity by them, and is thereafter converted to electric signals such as pulses by the rotary encoder 27.

Figure 5:
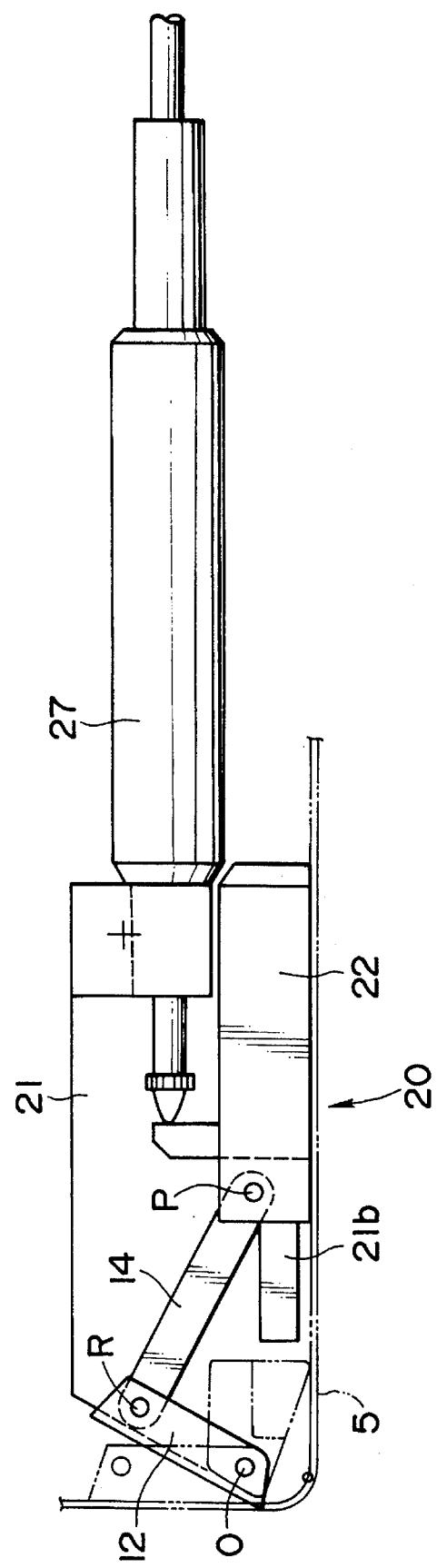
FIG. 5 is a front view of another bending angle detector.
Figure 6:
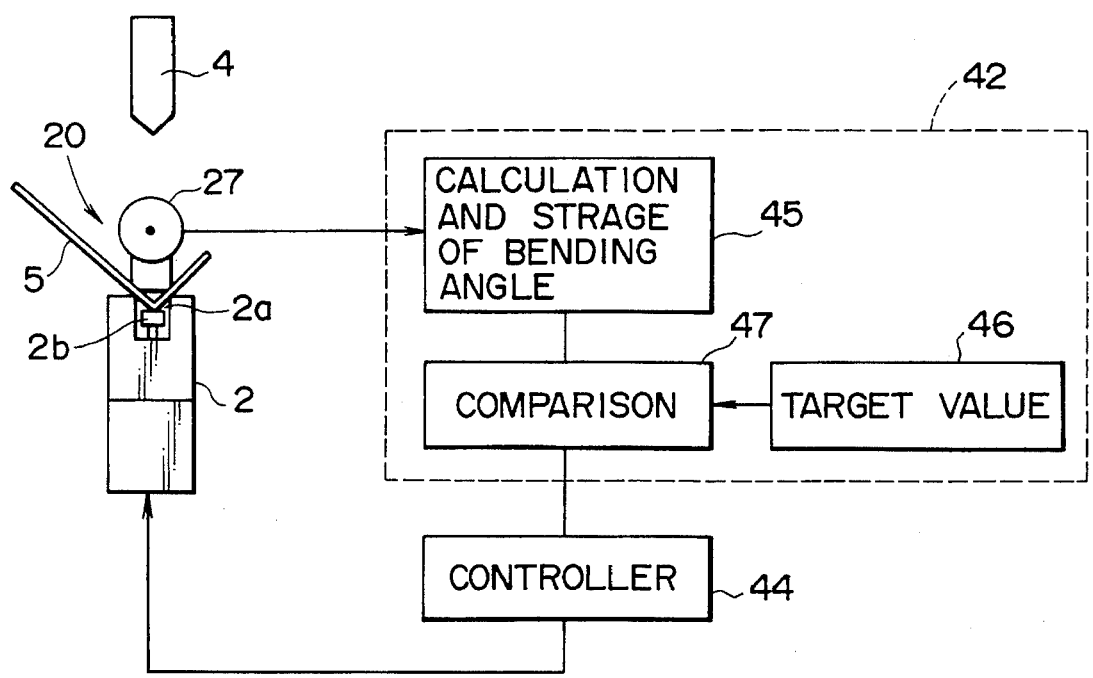
FIG. 6 is a block diagram of a bending angle control system.

The detector 20 shown in FIG. 5 is suitable for detecting the bending angle of the sheet material 5 to be bent into an L shape, and this detector corresponds to FIG. 2(c). Here, the linear displacement of the slider 22 is converted to the electric signals by a linear encoder 27 or by a differential transformer. When the differential transformer, is employed, its analog output signal is converted to a pulse signal by A/D conversion.

Next, the bending operation of the sheet material using such a bending angle detector will be explained.

Referring to FIG. 1, a control panel 40 is disposed by the side of the press brake, and includes a display 41, a data processor 42, a data input device 43 and a controller 44.

Bending of the sheet material 5 is carried out in accordance with the principle of 3-point bending, as described, for example, in Japanese Utility Model Publication No. 13696/1987. In other words, the bending angle of the sheet material is determined by the gap between both groove edges of the rectangular groove 2a of the lower die 2 and by the groove depth, provided that no spring-back exists. The depth of the rectangular groove 2a can be adjusted by a plurality of pan head pins 2b which are movably guided inside a plurality of vertical holes communicating with the rectangular groove 2a and which define the groove bottom.

The bending angle of the sheet material is calculated and stored (45) inside the data processor 42 from the signal of the encoder 27 of the bending angle detector, and is compared (47) with a target value (46), and the groove depth of the lower die and hence, the height of the pan head pins 2b, is adjusted by the controller 44 in accordance with the difference obtained by the comparison.

Figure 7:
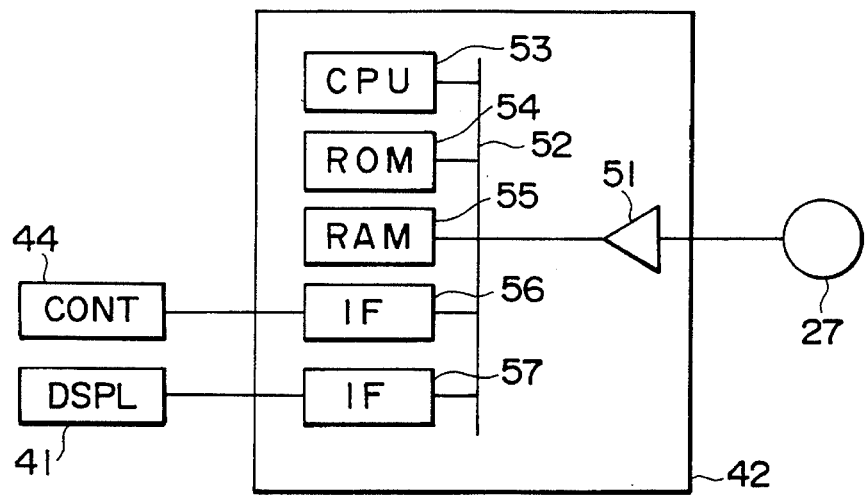
FIG. 7 is a block diagram of a data processor in FIG. 6.

FIG. 7 shows the data processor 42. The output signal of the encoder 27 of the bending angle detector is counted by a counter 51, is processed by a CPU 53, an ROM 54 and an RAM 55 connected to one another by a data bus 52, and is supplied to the controller 44 and to the display 41 through interfaces 56 and 57, respectively.

Figure 8:
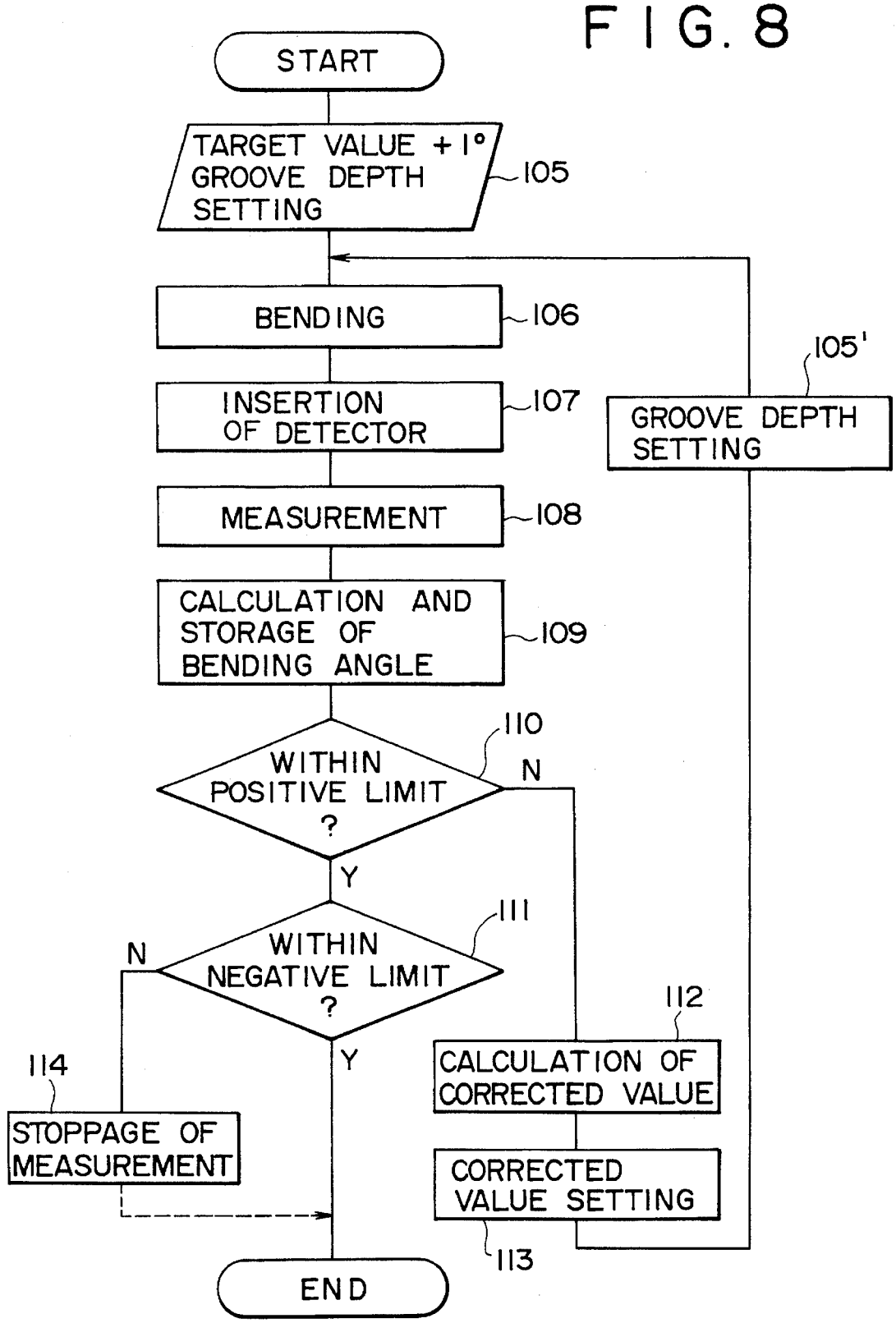
FIG. 8 is a flowchart of bending of a sheet material carried out by the bending angle detector.

A method of bending the sheet material using the bending angle detector according to the present invention will be explained with reference to FIG. 8. First of all, it will be assumed hereby that the sheet material 5 is to be bent 90°. A target value of 90° cannot be obtained immediately due to the dimension and materials of the sheet material, spring-back, and so forth. Therefore, the groove depth of the lower die 2 corresponding to a bending angle 90°+1° is first set in consideration of over-bending (Step 105). The sheet material 5 is bent by lowering the upper die 4 by the ram 3 (Step 106). While the sheet material 5 is kept held on the support mechanism 6, the upper mold 4 is moved up.

The detector 20 is inserted by the feed mechanism 8 into the range of the angle of the bent sheet material 5, that is, the product, to be measured (Step 107) and the bending angle is measured. The displacement of the node P or P' and P" of the link mechanism is transferred to the data processor 42 (Step 108). The bending angle is computed, is supplied to the controller 44 and is thereafter stored in the memory (Step 109). In the mean time, the detector 20 is removed by the feed mechanism 8 from the product.

The bending operation is completed if the measured bending angle (actual value) is within the positive allowable limit of the difference from the target value 90° such as 30' (Step 110) and furthermore, if it is within a negative allowable limit such as −30' (Step 111). A product having the desired bending angle can be obtained by bending the sheet material with the groove depth of the lower die 2 at that time.

If the measured bending angle does not fall within the positive allowable limit of the error from the target value, a correction value of the groove depth is calculated (Step 112). The correction value is set to the controller 44 and the groove depth is automatically set on the basis of this correction value (Step 105'). The procedures 106 to 111 are repeated until the desired bending angle can be obtained.

If the measured bending angle does not fall within the negative allowable limit of the error from the target value, this means over-bending. Accordingly, measurement is stopped (Step 114), and the sheet material is withdrawn.

I claim:

1. A device for measuring a bending angle of a bent sheet material bending of which is effected with die means which is supported in a press and has a lower die supported on a press bed and having an angular groove corresponding to a predetermined bending angle of the bent sheet material, and an upper die fixedly attached to a press ram vertically displaceable relative to the press bed, said device comprising:

a bending angle detector including first and second links arranged symmetrically relative to each other and pivotally connected with each other at one end thereof;

means for supporting said angle detector directly on the displaceable ram and for displacing said angle detector into an angular space defined by the bending angle of the bent sheet material; and means for biasing said first and second links into a surface contact with side surfaces of the bent sheet material defining the bending angle.

2. A measuring device according to claim 1, wherein said biasing means comprises a vertically displaceable slider associated with said first and second links, and spring means for biasing said slider into a position in which said first and second link reliably contact the side surfaces of the bent sheet material.

* * * * *